(12) United States Patent
Kawai

(10) Patent No.: US 8,418,063 B2
(45) Date of Patent: Apr. 9, 2013

(54) AIDING DEVICE IN CREATION OF CONTENT INVOLVING IMAGE DISPLAY ACCORDING TO SCENARIO AND AIDING METHOD THEREIN

(75) Inventor: Aritoki Kawai, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 254 days.

(21) Appl. No.: 12/869,027

(22) Filed: Aug. 26, 2010

(65) Prior Publication Data

US 2011/0126138 A1  May 26, 2011

(30) Foreign Application Priority Data

Nov. 20, 2009 (JP) ................. 2009-265134

(51) Int. Cl.
*G06F 3/00* (2006.01)
(52) U.S. Cl.
USPC ........... 715/726; 715/719; 715/720; 715/721; 715/722; 715/723; 715/731; 715/732; 715/781; 715/788; 715/798; 715/801; 715/804; 715/815
(58) Field of Classification Search .................. 715/765, 715/719, 720, 721, 722, 723, 726, 731, 732, 715/781, 788, 798, 801, 804, 815
See application file for complete search history.

(56) References Cited

U.S. PATENT DOCUMENTS

| | | | | |
|---|---|---|---|---|
| 4,833,625 A | * | 5/1989 | Fisher et al. | 345/668 |
| 5,532,833 A | * | 7/1996 | Hong et al. | 386/241 |
| 6,271,536 B1 | * | 8/2001 | Buytaert et al. | 250/584 |
| 6,313,835 B1 | * | 11/2001 | Gever et al. | 715/846 |
| 6,359,628 B1 | * | 3/2002 | Buytaert | 345/619 |
| 6,563,999 B1 | | 5/2003 | Suzuoki | |
| 6,983,420 B1 | * | 1/2006 | Itou et al. | 715/723 |
| 7,269,285 B2 | * | 9/2007 | Bober et al. | 382/190 |
| 7,388,986 B2 | * | 6/2008 | Bober et al. | 382/190 |

(Continued)

FOREIGN PATENT DOCUMENTS

JP    2001282857 A  * 10/2001

OTHER PUBLICATIONS ask search q=frame+sequence+image+link&qsrc=0&o=0&l, search performed Dec. 9, 2012.*

(Continued)

*Primary Examiner* — Boris Pesin
*Assistant Examiner* — John Heffington
(74) *Attorney, Agent, or Firm* — Matthew B. Dernier, Esq.; Gibson & Dernier LLP

(57) ABSTRACT

A request acknowledging unit in a scenario creation unit of a content creation aiding device acknowledges a user request related to scenario configuration. A displayed image processing unit displays an image on a display device to assist the user to set up a key frame. A key frame interpolation unit inserts a key frame that triggers switching of the display to a link destination image when the display area reaches an area in which a link is set up. A coordinate converting unit represents the key frame using frame parameters in a coordinate system of a post-switching image. A correction unit corrects the key frame by applying, to the key frame set up, correction that is opposite to the correction applied to a frame when the frame is displayed. A scenario file output unit creates an ultimate scenario file and stores the file in a storage device.

11 Claims, 12 Drawing Sheets

U.S. PATENT DOCUMENTS

| | | | |
|---|---|---|---|
| 7,423,657 B2* | 9/2008 | Wada et al. | 345/649 |
| 7,593,577 B2* | 9/2009 | Bober et al. | 382/190 |
| 7,689,041 B2* | 3/2010 | Bober et al. | 382/190 |
| 7,756,339 B2* | 7/2010 | Bober et al. | 382/190 |
| 7,940,987 B2* | 5/2011 | Bober et al. | 382/190 |
| 8,078,603 B1* | 12/2011 | Chandratillake et al. | 707/706 |
| 8,122,379 B2* | 2/2012 | Sakuyama et al. | 715/838 |
| 8,151,004 B1* | 4/2012 | Ufimtsev et al. | 709/246 |
| 8,219,975 B2* | 7/2012 | Goossen et al. | 717/122 |
| 2002/0054157 A1* | 5/2002 | Hayashi et al. | 345/838 |
| 2003/0147555 A1* | 8/2003 | Bober et al. | 382/190 |
| 2006/0100912 A1* | 5/2006 | Kumar et al. | 705/4 |
| 2006/0140455 A1* | 6/2006 | Costache et al. | 382/118 |
| 2006/0164441 A1* | 7/2006 | Wada et al. | 345/649 |
| 2007/0174624 A1* | 7/2007 | Wolosewicz et al. | 713/176 |
| 2007/0268528 A1* | 11/2007 | Ikeno et al. | 358/474 |
| 2008/0013834 A1* | 1/2008 | Bober et al. | 382/190 |
| 2008/0187177 A1* | 8/2008 | Bober et al. | 382/103 |
| 2008/0187226 A1* | 8/2008 | Bober et al. | 382/190 |
| 2008/0187227 A1* | 8/2008 | Bober et al. | 382/190 |
| 2008/0247676 A1* | 10/2008 | Minakuchi et al. | 382/305 |
| 2009/0017432 A1* | 1/2009 | Hoffmann et al. | 434/323 |
| 2009/0083815 A1* | 3/2009 | McMaster et al. | 725/110 |
| 2009/0113251 A1* | 4/2009 | Goossen et al. | 714/46 |
| 2009/0119585 A1* | 5/2009 | Sakuyama et al. | 715/273 |
| 2009/0193412 A1* | 7/2009 | Sugiura | 717/174 |
| 2009/0220166 A1* | 9/2009 | Choi et al. | 382/260 |
| 2010/0134847 A1* | 6/2010 | Hasegawa | 358/3.26 |
| 2010/0202707 A1* | 8/2010 | Costache et al. | 382/224 |
| 2010/0239175 A1* | 9/2010 | Bober et al. | 382/224 |
| 2011/0026431 A1* | 2/2011 | McCullough | 370/253 |
| 2011/0078269 A1* | 3/2011 | Wei et al. | 709/206 |

OTHER PUBLICATIONS ask search q=image+link+display+region+frame+sequen, search performed Dec. 9, 2012.* ask search qsrc=1 &o=0&l=dir&q=image+link+display+ar, search performed Dec. 9, 2012.* ask search qsrc=1&o=0&l=dir&q=image+link+display+re, search performed Dec. 9, 2012.*

* cited by examiner

| 302 | 304 | 306 | 308 | | | |
|---|---|---|---|---|---|---|
| 0.0, 0.0, 2.0, 0.0, | 98.0, | parent_0, | −0.100917, | 0.202552, | 0.08, | 0.0 |
| 0.16, −0.11, 0.01, 0.0, | −1.0, | child_0, | 0.0, | 0.0, | 1.0, | 0.0 |
| 0.10, −0.14, 0.01, 0.0, | −1.0, | child_1, | 0.0, | 0.0, | 1.0, | 0.0 |
| 0.07, −0.15, 0.01, 0.0, | −1.0, | child_2, | 0.0, | 0.0, | 1.0, | 0.0 |
| ... | | | | | | |

# AIDING DEVICE IN CREATION OF CONTENT INVOLVING IMAGE DISPLAY ACCORDING TO SCENARIO AND AIDING METHOD THEREIN

BACKGROUND OF THE INVENTION

1. Field of the Invention

The present invention relates to an information processing technology for aiding the creation of contents that include the display of images.

2. Description of the Related Art

Home entertainment systems are proposed capable of playing back moving images as well as running game programs. In home entertainment systems, a GPU generates three-dimensional images using polygons (see, for example, U.S. Pat. No. 6,563,999).

A technology is widely used in various contents that allows the display area on the screen to be changed according to an input request for movement as provided by the user viewing an image being displayed, by using a directional key, for example. Generally, the technology such as this provides the user with intuitive understanding of the relation between input information and output result by aligning the motion of, for example, hand manipulating an input device with the direction of movement of the display area.

A similar technology whereby the display area is automatically moved in a predefined sequence is also introduced in wide range of fields including demonstration and advertisement media. The display area as actually displayed may not be as intended by the one responsible for the configuration due to the fact that the configuration of the displayed order and the actual display are separate processes. For this reason, there is a problem in that post-configuration adjustment may be necessitated or expertise is required for configuration. The higher the resolution of the image to be displayed or the more complicated the image, the more demanding and time-consuming it is to create such contents. Thus, there are always requirements to efficiently and easily create contents including such type of image display.

RELATED ART LIST

U.S. Pat. No. 6,563,999

SUMMARY OF THE INVENTION

The present invention addresses the background and a purpose thereof is to provide a technology capable of representing contents, which include image display, in a versatile manner with an easy operation.

One embodiment of the present invention relates to a content creation aiding device. The content creation aiding device is for aiding the creation of a content in which a display area is moved according to a scenario file configuring the movement of the display area and images are displayed accordingly, the device comprising: a storage device configured to store a link configuration file and data for an image that should be displayed, the link configuration file being provided to switch from an image being displayed to another image when the display area reaches a specified linked area while a content is being run in a content running device such that the file contains a configuration of the linked area and a display area in the post-switching image; a request acknowledging unit configured to receive from a user a configuration of frame parameters of a plurality of key frames that represent points passed by the display area while the content is being run; a key frame interpolation unit configured to identify, between the key frames received via the request acknowledging unit, continuous key frames accompanying a movement from outside the linked area into the linked area and to additionally insert, between the continuous key frames, a key frame that represents a boundary for switching images; and a scenario file output unit configured to create a scenario file that describes frame parameters corresponding to the user configured key frames and the inserted key frame, and output the created file.

Another embodiment of the present invention relates to a content creation aiding method. The content creation aiding method is for aiding the creation of a content in which a display area is moved according to a scenario file configuring the movement of the display area and images are displayed accordingly, the method comprising: reading from a storage device a link configuration file and data for an image that should be displayed, the link configuration file being provided to switch from an image being displayed to another image when the display area reaches a specified linked area while a content is being run in a content running device such that the file contains a configuration of the linked area and a display area in the post-switching image; receiving from a user a configuration of frame parameters of a plurality of key frames that represent points passed by the display area while the content is being run; identifying, between the key frames acknowledged from the user, continuous key frames accompanying a movement from outside the linked area into the linked area and additionally inserting, between the continuous key frames, a key frame that represents a boundary for switching images; and creating a scenario file that describes frame parameters corresponding to the user configured key frames and the inserted key frame, and storing the created file in the storage device.

Still another embodiment of the present invention relates to a scenario file creation method. The scenario file creation method is for creating a scenario file added to a content in which a display area is moved, the scenario file containing a configuration for the movement of a display area, the method comprising: reading from a storage device a link configuration file and data for a plurality of images to be displayed in which a link area is set up, the link configuration file being provided to switch from an image being displayed to another image when the display area reaches a specified linked area while a content is being run in a content running device such that the file contains a configuration of the linked area and a display area in the post-switching image; acquiring frame parameters of a plurality of key frames configured for the pre-switching image, of the plurality of images that should be displayed, and a display order thereof, the key frames representing points passed by the display area while the content is being run; identifying, between the key frames, continuous key frames accompanying a movement from outside the linked area into the linked area and additionally inserting, between the continuous key frames, a key frame that represents a boundary for switching images; converting frame parameters of a key frame inside the linked area into frame parameters in the post-switching image configured in the link configuration file; creating a scenario file that describes frame parameters and a display order thereof in each image, the frame parameters being for all key frames including the inserted key frame; and storing the created file in the storage device.

Optional combinations of the aforementioned constituting elements, and implementations of the invention in the form of methods, apparatuses, systems, computer programs, and recording mediums encoded with computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

The contents generated and processed according to the embodiment use a plurality of images displayed and encompass animation in which the display area is changed in accordance with a predefined motion and images displayed are changed accordingly. Images displayed may include visual information such as game images, menu images, web site images, maps, photos, pictures, advertisements, newspapers, magazines, etc. The purpose of display and the post-display function are non-restrictive.

Figure 1:
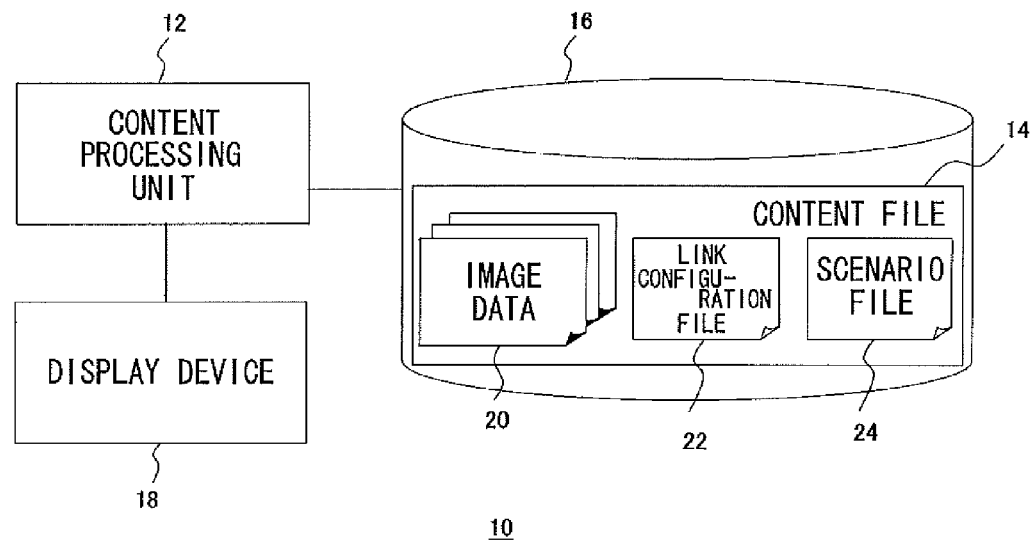
FIG. 1 shows the configuration of a content running device according to an embodiment adapted to run contents.

A summary of the contents generated according to the embodiment will be discussed. FIG. 1 shows the configuration of a content running device according to the embodiment adapted to run contents. A content running device 10 includes a storage device 16 storing a content file 14, a content processing unit 12 reading the content file 14 from the storage device 16 and running the content accordingly, and a display device 18 displaying an image resulting from running the content. The content file 14 includes an image data 20, a link configuration file 22, and a scenario file 24.

The content processing unit 12 reads the content file 14 from the storage device 16, uses the image data 20 to generate displayed images, moving the display area in accordance with the configuration established in the scenario file 24, and sequentially displays the images on the display device 18. The content processing unit 12 switches to the image using another image data when the display area reaches a predefined area in accordance with the configuration in the link configuration file 22. The content run by the content file 14 initiates a mode where the displayed image is switched, triggered by the movement of the display area.

The image data 20 in the content file 14 contains data for a plurality of images that can be displayed as independent images. The link configuration file 22 defines the display area in the pre-switching image, at which the image is switched, the data for the post-switching image, and the area to be displayed after switching. Hereinafter, a configuration that achieves the switching between images will be referred to as "link". The scenario file 24 defines data for the image to be displayed, and time-dependent variation of the display area.

Figure 2:
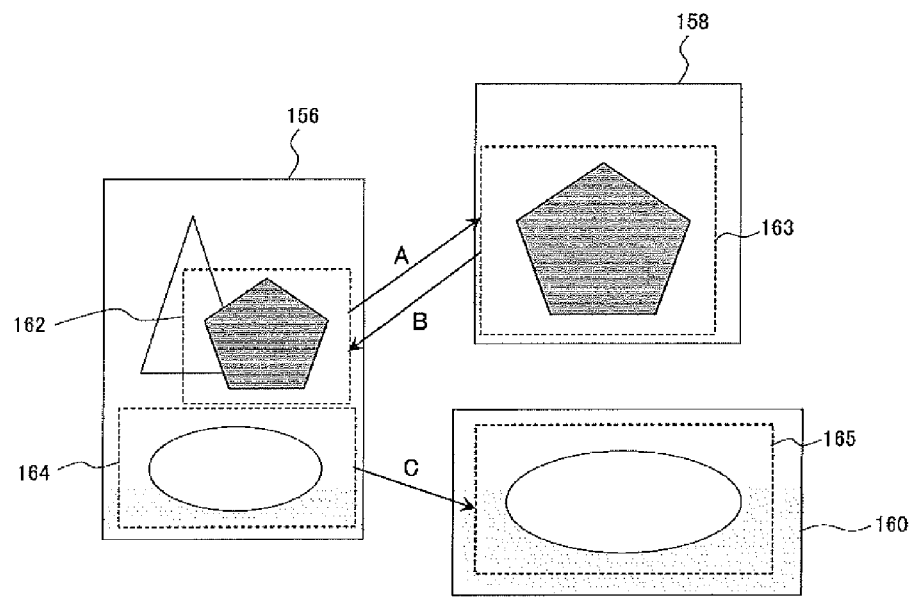
FIG. 2 shows how images are displayed when links are established between image data according to the embodiment.

FIG. 2 shows how images are displayed when links are established between image data. Referring to FIG. 2, three images 156, 158, and 160 are subject to display. It will be assumed that a link is established between an area 162 of the image 156 and an area 163 of the image 158 and a link is established between an area 164 of the image 156 and an area 165 of the image 160. Such areas will be referred to as "linked areas". When the display area is moved according to the scenario file 24 while the image 156 is being displayed so that the display area is aligned with the linked area 162, the image 156 is switched to the image 158 so that the linked area 164 in the image 158 is displayed (arrow A).

In the example of FIG. 2, the image 158 is, for example, an image showing an area around the pentagon in the image 156 with an increased resolution. Using the setup, a vivid content is presented. More specifically, as a zoomed-in view of the linked area 162 of the image 156 is shown, fine details of the pentagon are displayed using the image data for the image 158 with a higher resolution. By embedding another image in the pentagon area of the image 158, that is not viewable in the pentagon of the image 156, a mode of view can be presented in which an image not initially displayed appears.

Between the linked area 162 and the linked area 163, a link (arrow B) opposite in direction to the arrow A is also established as shown. In this case, when the display area is aligned with the linked area 163 for a second time (e.g., by reducing the display image after the transition denoted by the arrow A and the display of another area of the image 158), the image 158 is switched to image 156 so that the linked area 162 within the image 156 is displayed (arrow B). The transition (arrow C) from the linked area 164 of the image 156 to the linked area 165 of the image 160 occurs in a similar fashion. While the display area is aligned with the linked area 164 by, for example, displaying a zoomed-in view of the ellipse, while the image 156 is being displayed, image data used for display is switched so that the linked area 165 of the image 160 is displayed.

The type of images (the images 156, 158, and 160) subject to the processing according to this embodiment is non-restrictive. Hereinafter, however, hierarchical images will be discussed by way of example. The technology of displaying hierarchical images uses tile images generated from a digital image (e.g., a high resolution photo) and including a plurality of resolutions. The displayed image may be enlarged/reduced, or vertically or horizontally scrolled. According to the technology, an original image size is reduced in a plurality of steps so as to generate images of different resolutions. The image at each hierarchical level is split into one or a plurality of tile images, presenting the original image in the hierarchical structure. Normally, the image with the lowest resolution comprises one tile image. The original image with the highest resolution comprises the largest number of tile images. By switching from a tile image being used to a tile image of a different hierarchical level when the displayed image is enlarged or reduced, enlarged view or reduced view is quickly presented.

Figure 3:
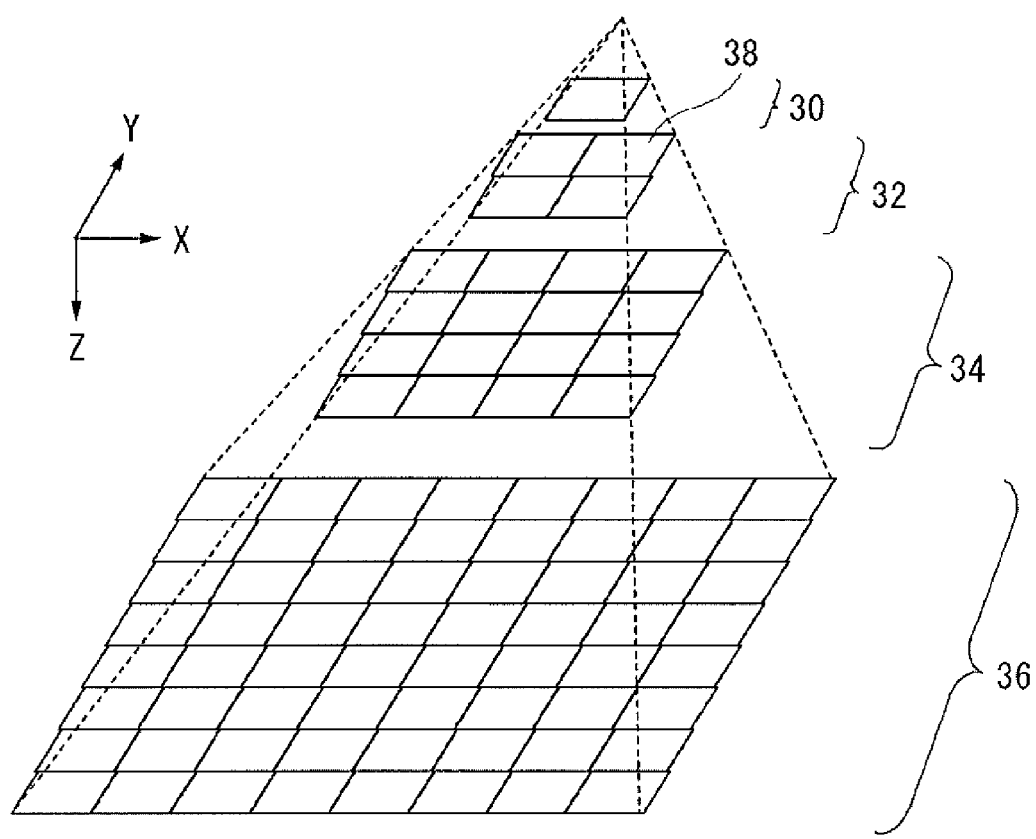
FIG. 3 shows the data structure of a hierarchical image that can be used in the embodiment.

FIG. 3 shows the data structure of an image used in the technology of displaying a hierarchical image. The image data has a hierarchical structure comprising a 0th layer 30, a first layer 32, a second layer 34, and a third layer 36 in the direction of depth (Z axis). While the figure only shows four layers, the number of layers is nonrestrictive. Hereinafter, the image data having such a hierarchical structure will be referred to as "hierarchical image data".

The hierarchical image data shown in FIG. 3 has a quadtree hierarchical structure. Each layer comprises one or more tile images 38. All of the tile images 38 are formed to have the same size having the same number of pixels. For example, an image includes 256×256 pixels. The image data in the layers are representations of the image in different resolutions. The original image in the third layer 36 having the highest resolution is reduced in a plurality of steps to generate the image data for the second layer 34, the first layer 32, and the 0th layer 30. For example, the resolution in the Nth layer (N is an integer equal to or greater than 0) may be ½ the resolution of the (N+1)th layer in both the horizontal (X axis) direction and the vertical (Y axis) direction.

The hierarchical image data is compressed in a predetermined compression format and is stored in a recording medium or a storage device in the form of the content file 14 along with other data necessary to process the content. As the content is started to be run in the content running device, or in the middle of the process, the data is read from a recording medium or a storage device and is decoded. A compression format that can be decoded by the content running device 10 (e.g., S3TC format, JPEG format, JPEG2000 format, etc.) is employed. Compression of the hierarchical image data may be performed for each tile image. Alternatively, a plurality of tile images included in the same layer or a plurality of layers may be compressed at a time.

As shown in FIG. 3, in the hierarchical structure of the hierarchical image data, the horizontal direction is defined along the X axis, the vertical direction is defined along the Y axis, and the depth direction is defined along the Z axis, thereby building a virtual three-dimensional space. The content running device 10 reads the movement of the display area preconfigured in the scenario file 24 and derives the coordinate, in the three-dimensional space, of the frame to be displayed. The device refers to the coordinate to switch the layer for images necessary for display.

Figure 4:
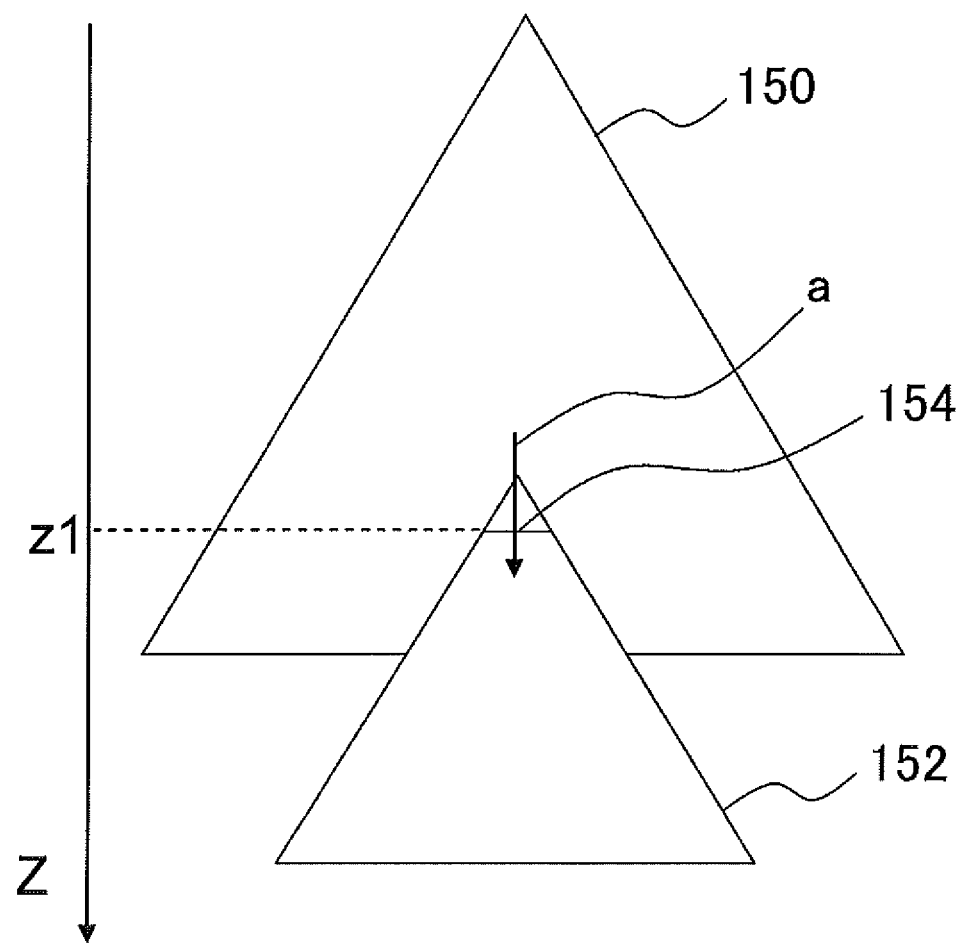
FIG. 4 schematically shows how a plurality of items of hierarchical image data are linked by a link configuration file according to the embodiment.

FIG. 4 schematically shows how a plurality of items of hierarchical image data are linked by the link configuration file 22. Referring to FIG. 4, two triangles represent different hierarchical image data 150 and 152. Each of the hierarchical image data 150 and 152 actually comprises a plurality of image data items with different resolutions are located discretely in the Z axis direction as shown in FIG. 3. The link configuration file 22 establishes a link between the hierarchical image data 150 and the hierarchical image data 152 in the area denoted by a line 154.

When the display area is moved as indicated by an arrow "a" according to the scenario file 24 while the image using the hierarchical image data 150 is being displayed, the display is switched to the image using the hierarchical image data 152. In other words, the display area moves between two sets of hierarchical image data. The hierarchical image data 150 and the hierarchical image data 152 may be representations of the same object using different resolutions or representations of different objects.

For example, assuming that the hierarchical image data 150 represents data for a world map and the hierarchical image data 152 represents data for a Japanese map, transition from the hierarchical image data 150 to the hierarchical image data 152 occurs by enlarging the Japanese area in the world map in the initial image, allowing the details of the Japanese map to be displayed. Assuming that the hierarchical image data 150 represents data for an on-screen menu and the hierarchical image data 152 represents data for a manual that explains icons displayed in the on-screen menu, the display can be switched to the image of the manual explaining the functions associated with the icons as the user enlarges a desired icon in the on-screen menu.

Thus, the embodiment uses the configuration in the link configuration file 22 to switch the image data used for rendering. For example, assuming the creation of contents in which an image of a world map can be successively enlarged until a high-resolution image showing buildings and streets is viewed, data for areas (e.g., oceanic areas) that need not be enlarged can be omitted by maintaining different hierarchical image data according to the range of resolution. Thereby, the data size is reduced as compared to a case where a single, huge hierarchical image data is built. Further, it is possible to display totally different images in succession. Applications to a variety of image presentations and creation of a variety of contents are possible.

Figure 5:
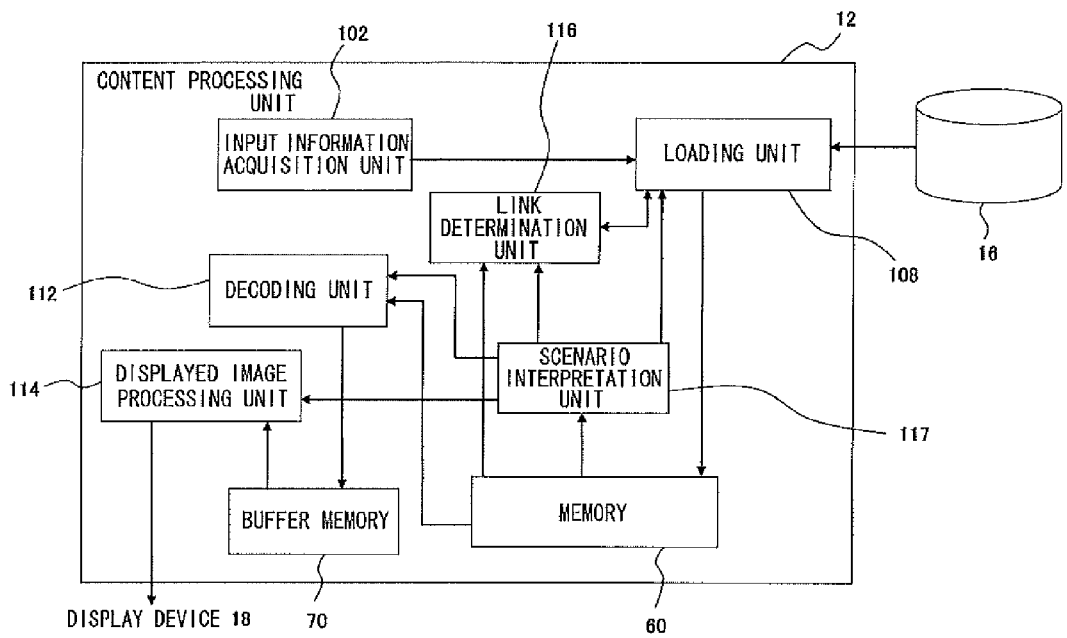
FIG. 5 shows the configuration of a content processing unit in the content running device according to the embodiment in detail.

FIG. 5 shows the configuration of the content processing unit 12 in the content running device 10 in detail. The content processing unit 12 includes an input information acquisition unit 102 configured to acquire a user request for running the content, a loading unit 108 configured to load data necessary for display from the storage device 16, a memory 60 configured to store data thus loaded, a link determination unit 116 configured to determine whether another image data is required due to a link, a decoding unit 112 configured to decode compressed image data, a buffer memory 70 configured to store the decoded data temporarily, and a displayed image processing unit 114 configured to render the displayed image. The content processing unit 12 further includes a scenario interpretation unit 117 that interprets scenario information set up so as to control the link determination unit 116, the loading unit 108, the decoding unit 112, and the displayed image processing unit 114.

The elements depicted in FIG. 5, etc. as functional blocks for performing various processes are implemented in hardware such as CPUs (central processing units), memories, or other LSI's, and in software such as a program loaded into a memory. Therefore, it will be obvious to those skilled in the art that the functional blocks may be implemented in a variety of manners by hardware only, software only, or a combination of thereof.

The input information acquisition unit 102 acquires user input designating, for example, the start/end of a content. The loading unit 108 loads the link configuration file 22 and the scenario file 24 from the storage device 16 into the memory 60, when the content is started. In addition, the unit 108 appropriately loads image data necessary for display. When hierarchical image data is to be displayed, loading may be performed in units of tile images, or in units of image blocks, each comprising a plurality of tile images grouped according to the size.

The scenario interpretation unit 117 refers to the scenario file 24 loaded into the memory 60 and successively calculates frame parameters indicating the position and size of the frame that should be subsequently displayed, in accordance with the movement of the display area established in the file. As described later, the scenario file 24 describes identification information of image data used for display and time-dependent change in the frame parameters in the coordinate system unique to each image data. When the image is switched according to the link configuration file 22, the scenario file 24 is also configured to describe data sets each comprising the identification information and the time-dependent change and arranged in the order of image data used.

The frame parameters of the next frame computed by the scenario interpretation unit 117 are communicated to the link determination unit 116, the loading unit 108, the decoding unit 112, and the displayed image processing unit 114. The information communicated includes the identification information of the image data and the frame parameters of the next frame. By presenting the frame parameters in the coordinate system unique to the image data, image data can be independently decoded or rendered without considering the relative position of the images.

The link determination unit 116 refers to the link configuration file 22 loaded into the memory 60 and verifies whether a linked area is included in a predetermined area including the next frame. When the next frame is in the neighborhood of the linked area, there is a likelihood that the display area enters the linked area, necessitating the switching of image data. Therefore, by loading the necessary image data in advance, images can be switched smoothly. Therefore, when the next frame is in the neighborhood of the linked area and not loaded into the memory 60, the link determination unit 116 requests the loading unit 108 to load at least the area including the linked area, from the image data at the link destination.

Simultaneously, the decoding unit 112 refers to the buffer memory 70 to verify whether there are any areas in the predetermined area including the next frame that have not been decoded yet. If there are any areas not decoded yet, the unit 112 reads a part of the compressed image data, from the memory 60 and stores the decoded data in the buffer memory 70. By decoding an extensive range of areas including the next frame, image display that keeps track with the display area movement established in the scenario file 24 is achieved. When a hierarchical image is to be displayed, data may be stored in the buffer memory 70 in units of tile images. The displayed image processing unit 114 refers to the frame parameters calculated by the scenario interpretation unit 117 and reads the corresponding image data from the buffer memory 70, renders the image of the next frame, and outputs the rendered image to the display device 18 at an appropriate point of time.

Figure 6:
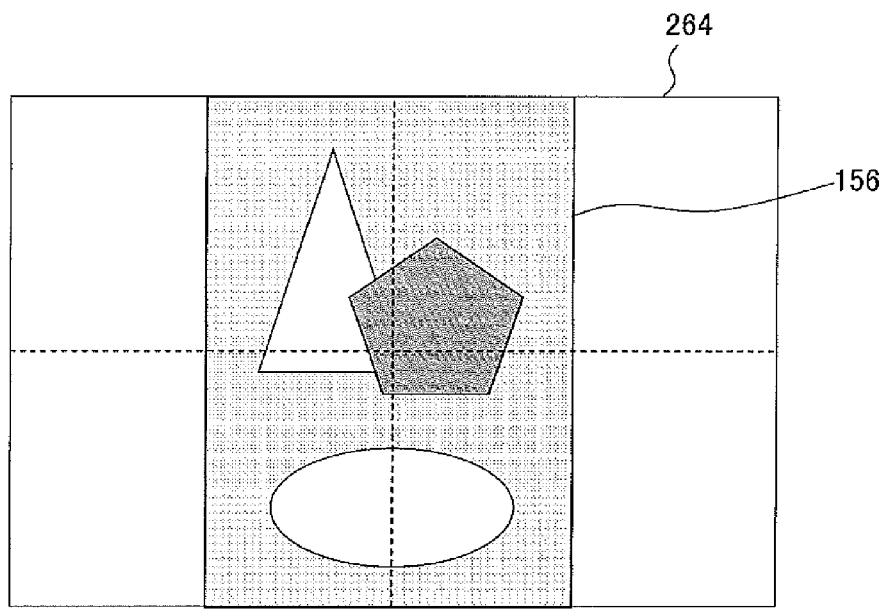
FIG. 6 is an illustration of how frame parameters are defined according to the embodiment.

As described above, according to the embodiment, a coordinate system is defined for each of a plurality of items of image data that should be displayed, and the frame parameters are represented in each coordinate system. Therefore, all image data can be independently and similarly processed and displayed. A description will now be given of the frame parameters used in this embodiment. FIGS. 6-9 are illustrations of how frame parameters are defined. FIG. 6 shows the relative position of a reference frame and an image. Referring to FIG. 6, a reference frame 264 relative to the image 156 is defined as a rectangle circumscribing the image 156 and having a predetermined aspect ratio, the center of the frame 264 being aligned with the center of the image 156.

The aspect ratio may be a predetermined value. For example, the aspect ratio may be identical to the aspect ratio of the display device displaying the image or to the aspect ratio of the display area on the display device. It is ensured that the frame maintains the same ratio as the displayed image is enlarged or reduced. The frame that should be displayed in the content running device is represented by four frame parameters including a horizontal offset, a vertical offset, where it is given that the horizontal and vertical sides of the reference frame 264 are 1, a magnification ratio, an angle of rotation. Thus, the coordinate system unique to the image 156 is defined relative to the reference frame 264. The frame parameters of the reference frame 264 itself are "horizontal offset, vertical offset, magnification ratio, angle of rotation) =(0, 0, 1, 0, 0).

Figure 7:
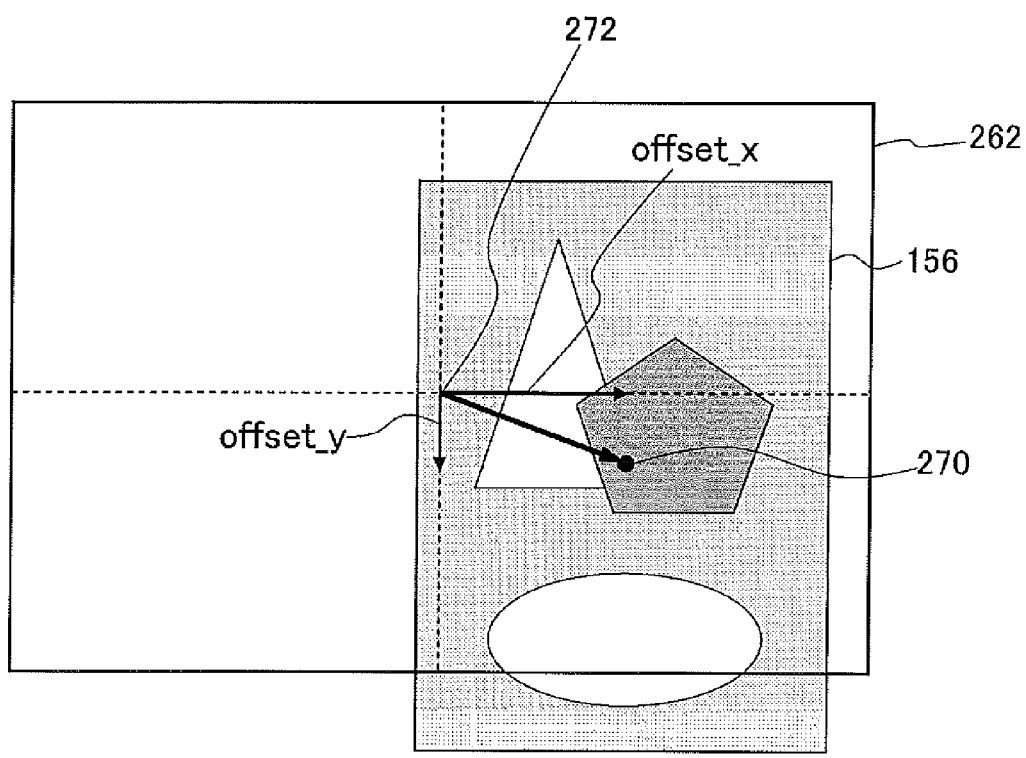
FIG. 7 is an illustration of how frame parameters are defined according to the embodiment.

FIG. 7 shows how a frame is defined when the frame is moved from the reference frame on the image plane. In this case, parameter values are substituted into the vertical offset and the horizontal offset. More specifically, the horizontal component offset_x and the vertical component offset_y of the distance between the center 272 of a frame 262 and the center of the image 156, i.e., the center of the reference frame, represent the values of the horizontal offset and the vertical offset, respectively. Therefore, the frame 262 is represented as (offset_x, offset_y, 1, 0, 0).

Figure 8:
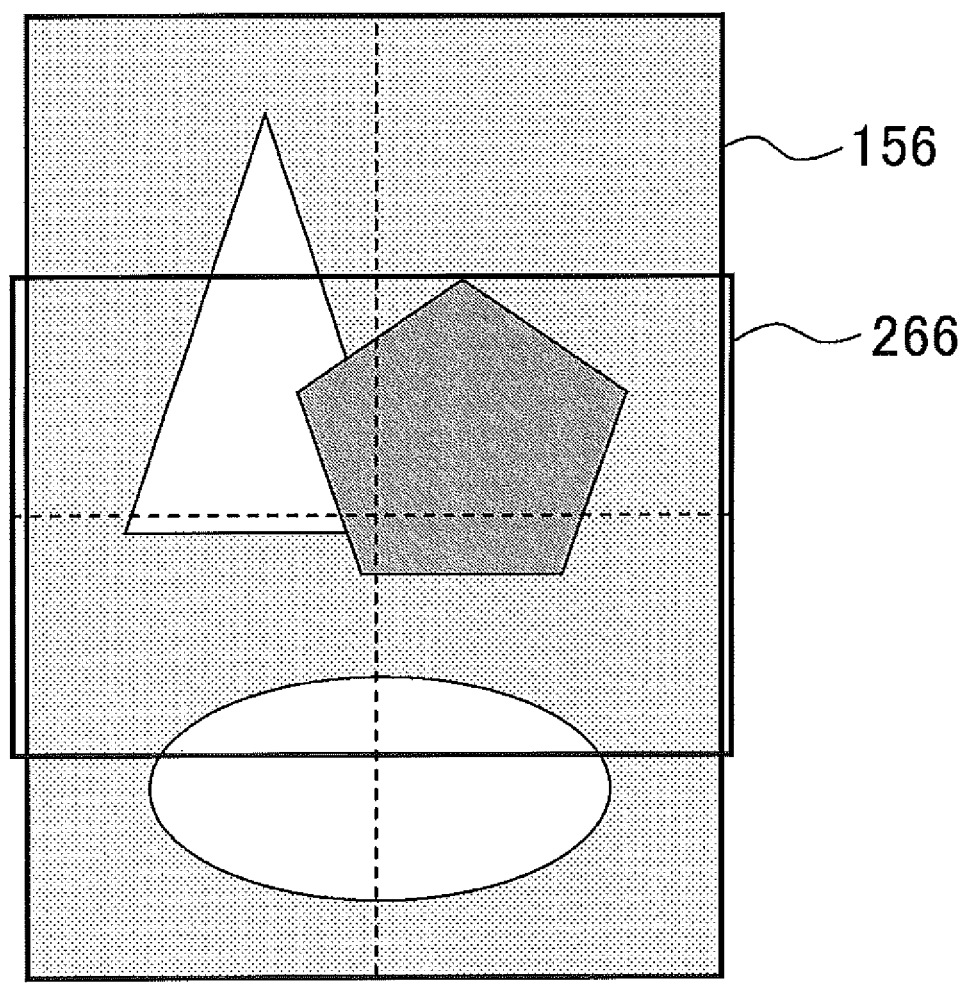
FIG. 8 is an illustration of how frame parameters are defined according to the embodiment.

FIG. 8 shows how a frame is defined when the frame is not moved from the reference frame on the image plane and the magnification ratio is varied. In this case, the area ratio of a frame 266 with respect to the reference frame is substituted into the parameter of the magnification ratio. Given that the area of the frame 266 of FIG. 8 is 0.5 times the area of the reference frame 264 of FIG. 6, the frame 266 is represented as (0, 0, 0, 5, 0).

Figures 9, 10:
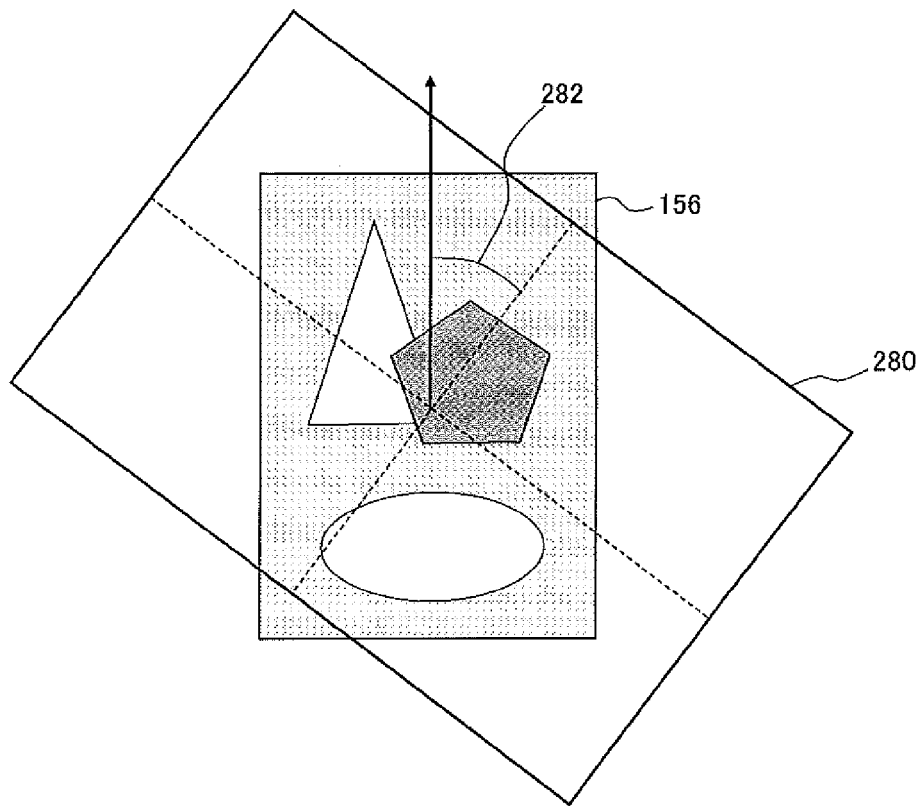
FIG. 9 is an illustration of how frame parameters are defined according to the embodiment.
FIG. 10 shows an example of data structure of the link configuration file according to the embodiment.

FIG. 9 shows how a frame is defined when the frame is not moved from the reference frame on the image plane and rotated. In this case, an angle of rotation 282 of a frame 280 from the reference frame is substituted into the parameter of angle of rotation. For example, given that the angle of rotation 282 is 0.25π, the frame 280 is represented as (0, 0, 1, 0, 0.25). By combining the movement, enlargement, and rotation as shown in FIGS. 7-9, any frame can be represented by four frame parameters (variables).

A description will now be given of how the scenario file 24 is configured using frame parameters. The scenario file 24 includes identification information on the image data that should be displayed, frame parameters of a key frame, time intervals elapsed until the next key frame is reached, etc. The scenario file may be described using a markup language such as XML that can be interpreted by the content running device 10. The scenario interpretation unit 117 reads the scenario file 24 from the memory 60 and calculates the frame parameters of the frames at the respective points of time based on the frame rate, so as to interpolate key frames by linear interpolation or spline interpolation. Decoding and rendering are performed accordingly so that the frames are successively displayed.

An example of the scenario file 24 described in XML will be given. It will be hereinafter assumed that the image is not rotated for ease of understanding and the angle of rotation in the frame parameters is omitted.

```
<?xml version="1.0" encoding="utf-8"?>                              (1)
<Viewer>                                                            (2)
    <FileList>                                                      (3)
        <File name="INDEX"/>                                        (4)
    </FileList>                                                     (5)
    <InitCameraPosition x="-0.2" y="-0.2" scale="0.6"/>             (6)
    <Section>                                                       (7)
        <Event type="change" name="INDEX" wait="0.0">               (8)
            <CameraPosition x="-0.2" y="-0.2" scale="0.6"/>         (9)
        </Event>                                                    (10)
    </Section>                                                      (11)
    <Section>                                                       (12)
        <Event type="camera" name="camera1" wait="0.0">             (13)
            <Interpolator                                           (14)
                duration='4.0'                                      (15)
                type='linear'                                       (16)
                key='0 0.5 1.0'                                     (17)
                keyValue='                                          (18)
                    -0.2 -0.2 0.6                                   (19)
                    -0.1 -0.1 0.5                                   (20)
                    -0.1 -0.1 0.25                                  (21)
                '/>                                                 (22)
        </Event>                                                    (23)
    </Section>                                                      (24)
</Story>                                                            (25)
</Viewer>                                                           (26)
```

In the above list, lines 7-11 indicate that image data named "INDEX" should be displayed. The frame from the image with the frame parameters (−0.2, −0.2, 0.6) is displayed as an initial image. Lines 12-24 define how the display area is moved. More specifically, the display area is moved over a period of four seconds (line 15) and moved linearly (line 16). At points of time 0, 0.5, and 1.0 (line 17), where 0 denotes the start time and 1.0 denotes the end time, frames with the frame parameters (−0.2, −0.2, 0.6), (−0.1, −0.1, 0.6), and (−0.1, −0.1, 0.25) are respectively displayed. A key frame occurs at a pass point as the display area is moved and is defined as a frame for which the frame parameters are described in the scenario file 24.

A description will now be given of how a link configuration file using frame parameters is configured. FIG. 10 shows an example of data structure of the link configuration file 22. A line in the link configuration file 22 represents a link, i.e., a description of switching from a given image data item to another image data item. A line comprises four fields including a link source image frame field 302, a valid scale range field 304, a link destination file field 306, and a link destination image frame field 308. The link source image frame field 302 designates, using the aforementioned frame parameter, an area in the image being displayed where switching to another image data occurs, i.e., a linked area. An example of the area is the linked area 163 in FIG. 2 linked by the arrow B.

The valid scale range field 304 designates a range of magnification ratio in which the link is valid. The magnification ratio in the link source image frame field 302 marks a bound of the range. Referring to the first line of FIG. 10, the magnification ratio of the linked area indicated in the link source image frame field 302 is "2.0", and the value of the valid scale range field 304 is "98.0". Therefore, the line establishes that the link is valid, meaning the image data is switched, if the magnification ratio of the frame is 2.0-100.0.

For example, the link indicated by the arrow B in FIG. 2 allows switching the display to the image 156 when the image is zoomed out, i.e., when a frame smaller than the linked area 163 in the image 158 is enlarged until the frame is aligned with the linked area 163. Accordingly, a positive value of the valid scale range field 304 is entered to make the link valid when the magnification factor of the frame is equal to or more than "2.0", which is the magnification factor of the linked area 163. This allows the link to be valid even when the magnification factor is satisfactorily increased while the image 158 is being displayed and then the display area is moved to a range that includes the linked area 163.

The link indicated by the arrow A in FIG. 2 allows switching the display to the image 158 when the image is zoomed in, i.e., when a frame larger than the linked area 162 in the image 156 is reduced until the frame is aligned with the linked area 162. Accordingly, a negative value (e.g., "−1.0") is entered in the valid scale range field 304 as indicated by the second line of FIG. 10. The link destination file field 306 designates the name of image at the link destination. In the example of the link indicated by the arrow B in FIG. 2, the data name of the image 156 is entered in the field 306. The link destination frame field 306 designates the frame occurring after the image data is switched, i.e., the frame for the linked area, using the frame parameters for the destination image.

The link configuration file 22 may be created for each image data at the link source. In other words, information on the link indicated by the arrows A and C in FIG. 2 may be described in the link configuration file of the data for the image 156, and information on the link indicated by the arrow B may be described in the link configuration file of the data for the image 158 so that the files may be stored in association with the corresponding image data. This can ensure that movement occurs independently even if links are established bilaterally. For example, the linked areas 162 and 163 involved in the transition indicated by the arrow A may be different from the linked areas 162 and 163 involved in the transition indicated by the arrow B.

A discussion will now be given of the creation of contents where a plurality of images with links established are displayed and the display area is moved automatically. The image data has a coordinate system unique to its own so that the images can be processed independently. Therefore, if the movement of the display area should be configured in the scenario file 24, key frames for pre-switching and post-switching images should be designated in the individual coordinate systems. Meanwhile, since the images as displayed are located on continuous areas, the display area should move continuously and smoothly regardless of whether the switching occurs.

Figure 11:
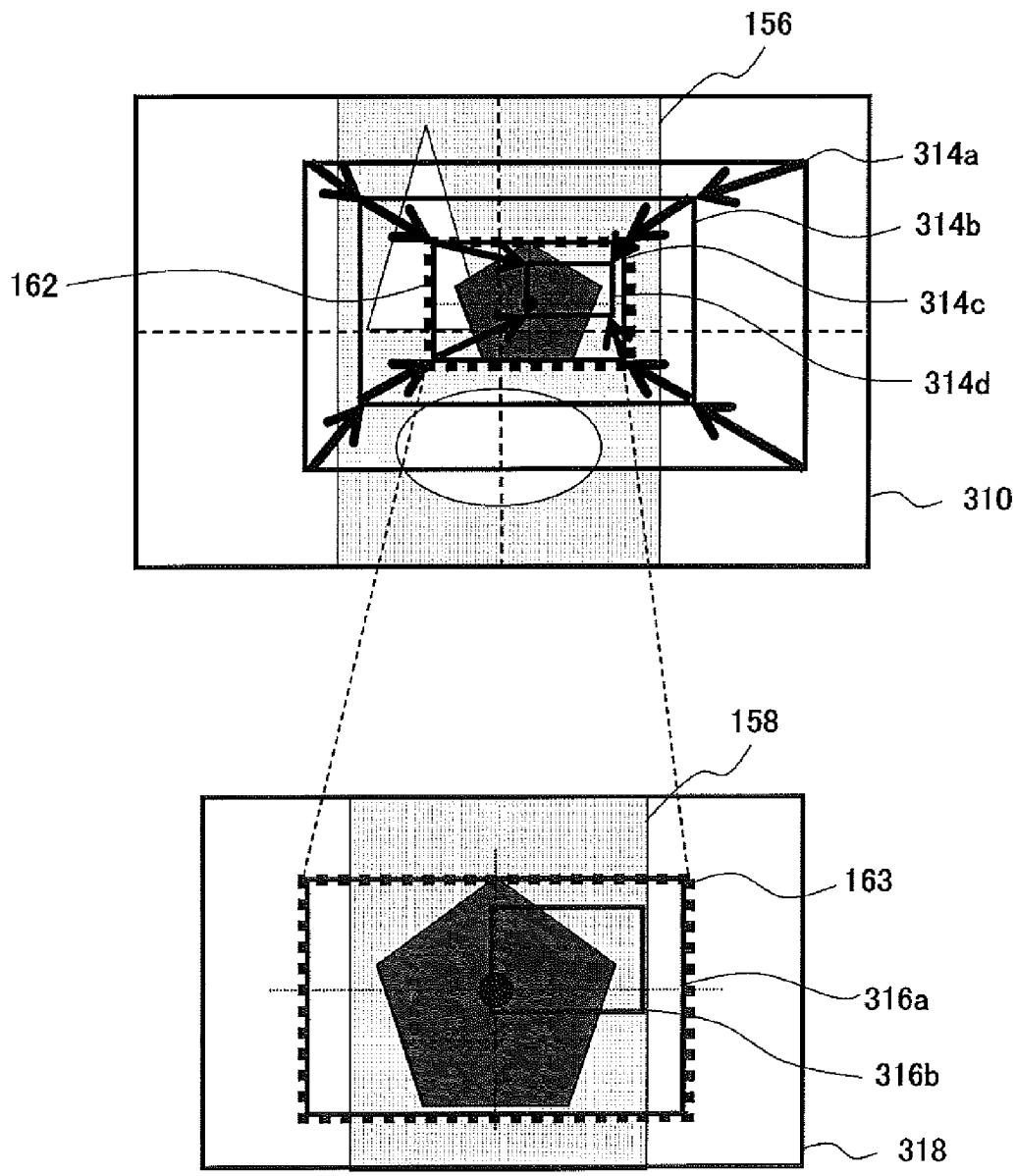
FIG. 11 shows how frame parameters are set when a scenario file is crested for an image in which a link is established according to the embodiment.

FIG. 11 shows how frame parameters are set when a scenario file is created for images in which a link is established. Referring to FIG. 11, the image 156 at the top and the image 158 at the bottom correspond to the images 156 and 158 in FIG. 2. The linked area 162 (dotted line) switched to the linked area 163 in the image 158 is set up in the image 156.

A discussion will be given of the display area movement where the image is zoomed up onto the linked area 162 until the movement is terminated so that an area within the linked area 162 is displayed. In other words, it is assumed that the display area is moved such that a first key frame 314a→a second key frame→a third key frame 314c→a fourth key frame 314d. Since the first key frame 314a and the second key frame 314b are displayed using the data of the image 156, the frame parameters are designated using values relative to the reference frame 310, i.e., relative to the coordinate system of the image 156.

Meanwhile, for the link action to take effect, the third key frame 314c and the fourth key frame 314d should be displayed using the data of the image 156 occurring after the switching due to the link. Therefore, the frames 314c and 314d should be designated using the frame parameters of the corresponding frames in the coordinate system of the image 158, i.e., 316a and 316b. Therefore, the content creator should use different coordinate systems before and after the switching in consideration of the frame from which the switching occurs.

As a result of switching the coordinate system before and after switching the image, the length of the image corresponding to a single unit of frame parameter changes. In addition, the direction of movement occurring before the switching may differ from the direction of movement of the display area after switching unless the frame from which the switching occurs is set at an appropriate position. In the example of FIG. 11, even if it is intended to move the display area in a straight fashion from the first key frame 314*a* to the fourth key frame 314*d*, the direction of the motion vector may change before and after the switching as a result of setting the third key frame 314*c* (=the frame 316*b*).

In the eyes of a content viewer, this creates an appearance in which the movement of the display area is twisted unnaturally before and after the image switching. In order to move the display area while ensuring switching images with a natural movement, key frames should be set on a trial and error basis, considering the position of the linked area and the difference between coordinate systems for respective images. The embodiment addresses this concern and facilitates the creation of contents in which the continuous movement of display area is achieved irrespective of whether images are switched, while maintaining the efficiency of display process by using coordinate systems unique to respective images.

Figure 12:
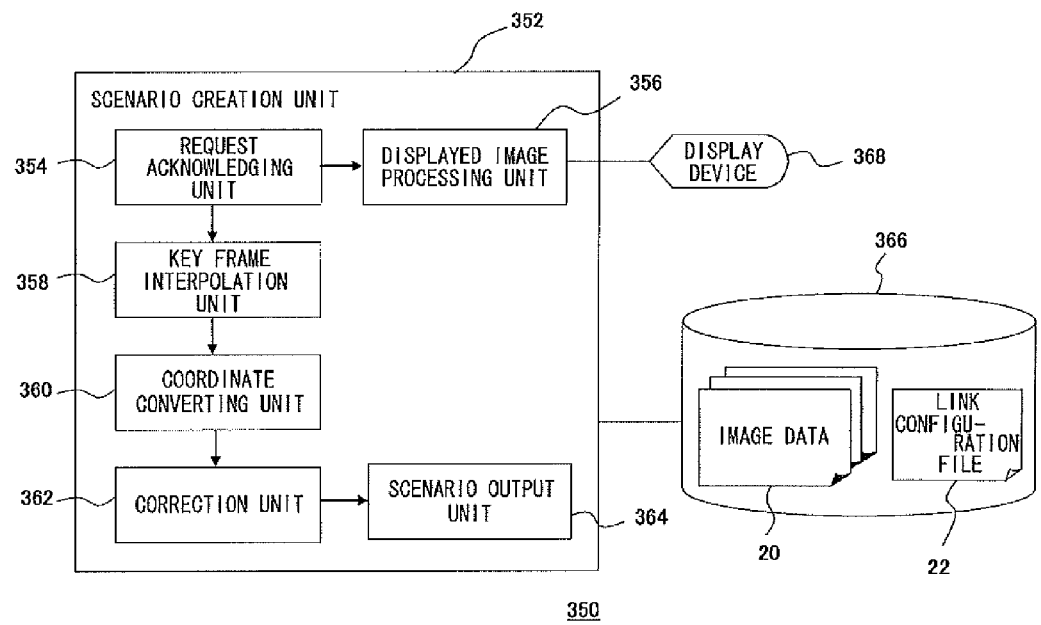
FIG. 12 shows the configuration of a content file creation aiding device according to the embodiment.

FIG. 12 shows the configuration of a content file creation aiding device according to the embodiment. A content creation aiding device 350 includes a scenario creation unit 352, a storage device 366, and a display device 368. The storage device 366 stores the image data 20 and the link configuration file 22 contained in the content file 14 of FIG. 1. As described below, the content creation aiding device 350 primarily aids the creation of a scenario file. However, the device 350 is also capable of aiding the creation of a link configuration file 22 using a similar interface. Hereinafter, it is assumed that links are already set up in the image data 20.

The scenario creation unit 352 includes a request acknowledging unit 354 for acknowledging a user input related to the configuration of a scenario, a display image processing unit 356 for implementing the graphic user interface (GUI) used by the user for configuration, a key frame interpolation unit 358 for interpolating key frames occurring when the image is switched, a coordinate converting unit 360 for converting the post-switching frame parameters, a correction unit 362 for correcting the key frame set up in the scenario file based on the method of correcting frames when the image is displayed, and a scenario file output unit 364 for outputting the ultimate scenario file.

The request acknowledging unit 354 acknowledges information related to scenario configuration entered by the user viewing an input screen displayed on a display device 368. For example, the display image processing unit 356 displays a target image and a rectangle indicating the frame. The user moves the rectangle on the target image or change its size by using the request acknowledging unit 354 and sets up a key frame by providing an input via the request acknowledging unit 354 to indicate the desired position and size of the key frame.

The key frame set up here is acquired with reference to the coordinate system in the image at the link source, irrespective of whether the frame is outside or inside the linked area. The request acknowledging unit 354 may be any input device that allows the user to designate data of a target image that should be displayed, move a rectangle indicating a frame, and confirms the selection. For example, the unit 354 may be any input device such as a keyboard, mouse, controller, button, touch pen, etc. or a combination thereof.

The display image processing unit 356 reads the image data 200 from the storage device 20 and displays the target image that should be processed on the display device 368. Only the image at the link source may be displayed. By not allowing to switch between the images to be displayed even if a link is set up, the display area movement across linked areas can be intuitively and easily configured. Alternatively, the relative positions of images linked may be made known by switching the display to the image at the link destination, for which the scenario should be set up, and continuing to display a partial area in the link source image surrounding the link destination image, in a semi-transparent fashion. The display image processing unit 356 further superimposes a rectangle representing a frame, thereby assisting the user to set up a key frame. The unit 356 moves the rectangle as displayed so as to reflect a user input for movement provided via the request acknowledging unit 354.

The key frame interpolation unit 358 refers to the key frames set up by the user and the link configuration file 22 to insert, as a key frame, a frame that triggers the switching from a link source image to a link destination image between the key frames set up by the user. As mentioned before, by setting up such a key frame appropriately, abrupt change in the motion vector of the display area is prevented from occurring upon image switching, allowing natural display area movement and image switching. Key frames following the key frame thus inserted may be subject to coordinate conversion by the coordinate conversion unit 360. A specific method of processing will be discussed later.

Of the key frames set up by the user, the coordinate conversion unit 360 converts the frame parameters of the key frames following the key frame inserted by the key frame interpolation unit 358 so that the frames are represented in the coordinate system of the post-switching image. Given that the frame parameters of the linked area in the link source image are (X1, Y1, S1) and the frame parameters of the linked area in the link destination image are (X2, Y2, S2), the frame parameters (Xb, Yb, Sb) in the coordinate system of the link destination image corresponding to the frame parameters (Xa, Ya, Sa) in the coordinate system of the link source image are determined as follows.

$$Xb = \frac{S2}{S1}\left(Xa - \left(X1 - \frac{S1}{S2} \times X2\right)\right) \quad (1)$$

$$Yb = \frac{S2}{S1}\left(Ya - \left(Y1 - \frac{S1}{S2} \times Y2\right)\right)$$

$$Sb = \frac{S2}{S1} \times Sa$$

Expression 1 enables the frame parameters for the post-switching image to be appropriately set even if the key frame is configured in the coordinate system of the link source image, irrespective of whether the frame is outside or inside the linked area. In this way, the user can directly set up a key frame in the link destination image while viewing the link source image, without switching the display to the link destination image. Thereby, the user can set up continuous movement of the display area without being aware of the linked area.

The correction unit 362 corrects the key frame as necessary so that a series of key frames obtained as a result of user setting, interpolation, and coordinate conversion can be ultimately displayed in the content running device. Some content running devices have the function of moving the display area interactively in response to a display area movement request signal initiated by user input, as well as moving the display area according to the scenario file 24.

In order to avoid a situation in which data decoding falls behind the schedule or the display image abruptly changes, making the view of displayed image uncomfortable, the content running device may perform a correction process for mitigating time-depending change in the frames directly obtained from the display area movement request signal. When contents are created for the content running device performing the process of this type, key frames are corrected by applying a process opposite to the frame correction process performed in the content running device. A specific method of processing will be discussed later.

The scenario file output unit 364 creates a scenario file that describes necessary information such as the frame parameters of the key frame ultimately determined, identification information of the image data, time intervals for displaying key frames, and stores the file in the storage device 366. Time intervals or interpolated shapes between key frames may be designated by user input via the request acknowledging unit 354. Alternatively, the scenario file output unit 364 may configure the intervals or shapes according to a predefined rule. For storage in the storage device 366, the content file 14 shown in FIG. 1 may be created by integrating the scenario file, the image data 20 that should be processed, and the link configuration file 22 into a single file.

Figure 13:
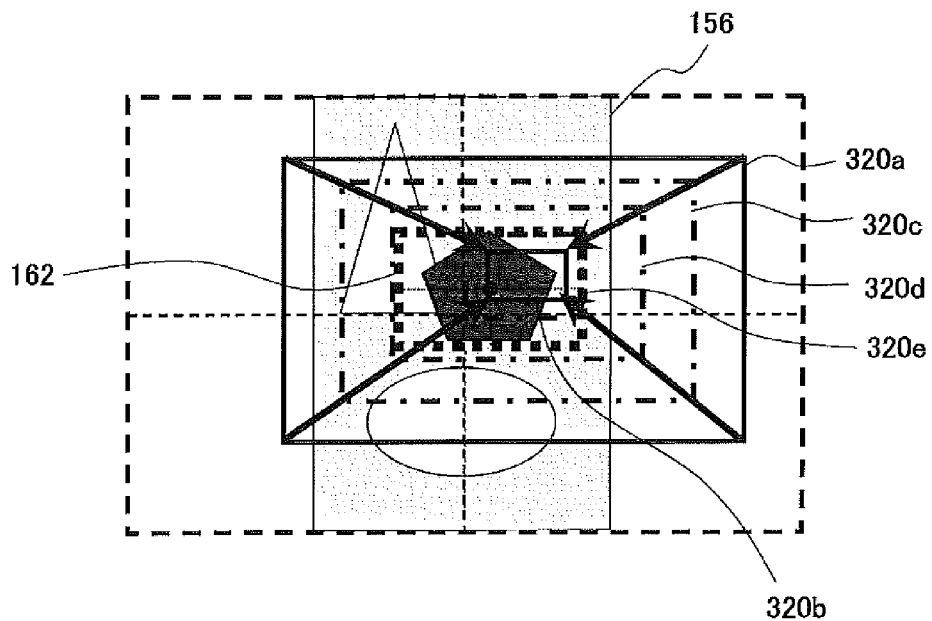
FIG. 13 shows the principle whereby a key frame interpolation unit interpolates key frames.

FIG. 13 shows the principle whereby the key frame interpolation unit 358 interpolates key frames. As in FIG. 11, the linked area 162 (dotted line) is established in the image 156. It will be assumed that the user sets up a straight movement from a first key frame 320a denoted by the solid line to a second key frame 320b, as indicated by the arrow. The second key frame 320b is located inside the linked area 162. However, as mentioned before, the user sets up a key frame without considering the fact.

In response to the key frame setting provided by the user, the key frame interpolation unit 358 changes frames at predetermined time intervals such that a frame 320c, a frame 320d, a frame 320e . . . (chain line) occur, given that the display area is moved from the first key frame 320a to the second key frame 320b. All these frames are located on the motion vector leading from the first key frame 320a to the second key frame 320b, i.e., the frames have positions and sizes that interpolate the change in the size and position between the first key frame 320a and the second key frame 320b.

Of those frames, the first frame 320e that is completely included in the linked area 162 is identified and is added as a key frame that triggers image switching. Among the key frames set up by the user, given that the frame parameters of the key frame 320a, which is the last key frames outside the linked area, are (xo, yo, so), the display time thereof is t0, the frame parameters of the key frame 320b, which is the first key frame inside the linked area, are (xi, yi, si), and the display time thereof is ti, the frame parameters of a candidate frame (xm, ym, sm) and the display time thereof tm are as follows, $$xm = xo + (xi - xo) dt \times n$$

$$ym = yo + (yi - yo) dt \times n$$

$$sm = so + (si - so) dt \times n$$

$$tm = to + (ti - to) dt \times n \quad (2)$$

where dt indicates a time step, and n indicates a natural number. By varying n such that n=1, 2, . . . , the candidate frames 320c, 320d, and 320e are successively obtained along a path leading from the first frame 320a toward the second key frame 320b. By determining whether each candidate frame is located within or outside the linked area 162, the frame parameters and the display time of the frame 320e included in the linked area 162 first are identified and the frame 320e is added as a key frame.

By ensuring that the time step dt is shorter than the frame display interval in the content running device, the frame parameters of the post-switching image are accurately calculated so that the display area can be moved, maintaining continuity from the pre-switching frame. Using the configuration as described above, changes in the motion vector of the display area are prevented from occurring upon switching.

A description will now be given of a specific example of the method of correction performed by the correction unit 362. Since the correction discussed here is a calculation opposite to the correction calculation performed by the content running device to mitigate a time-dependent change in the frame, as mentioned above, the procedure is dependent on the content running device. Correction performed in the content running device may be such that the motion of the immediately preceding is reflected so as to determine the subsequently displayed frame. For example, the frame parameters directly derived from the display area movement request signal occurring at each point of time may be translated into Gauss functions of time, whereupon a convolution filter is used to perform convolution operations using the frame parameters occurring at a previous point of time. Alternatively, the frame parameters as derived may be weighted, using frame parameters occurring at a predetermined number of points of time.

Figure 14:
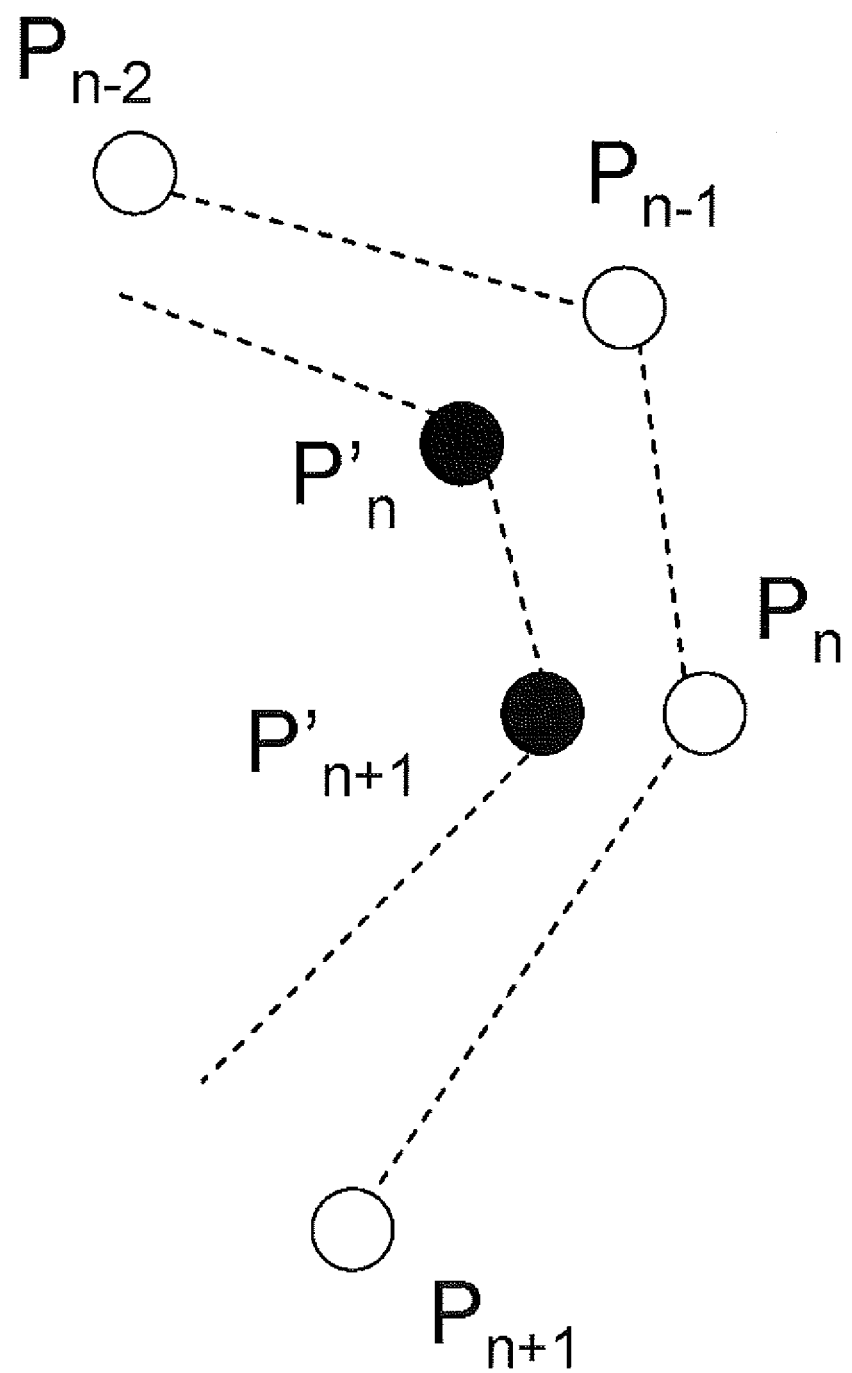
FIG. 14 schematically shows how frame parameters are corrected in the content running device according to the embodiment.

FIG. 14 schematically shows how frame parameters are corrected in the content running device. Referring to FIG. 14, blank circles Pn−2, Pn−1, Pn, Pn+1, . . . indicate frame parameters that represent inputs at time n−2, n−1, n, n+1, . . . at which the frame is updated, and solid circles P'n, P'n+1, . . . indicate frame parameters of the frames actually displayed.

It will be assumed that the device respectively weights the pre-correction frame parameters for the frames occurring at three points of time, i.e., for the immediately preceding two frames and the frame subject to correction, by factors ¼, ½, and ¼ in the stated order, thereby producing post-correction frame parameters. The post-correction frame parameters P'n at time n is given by $$P'_n = \frac{1}{4} P_{n-2} + \frac{1}{2} P_{n-1} + \frac{1}{4} P_n \quad (3)$$

Given that a scenario file is created for contents run in the device performing the correction as described above, solid circles in FIG. 14 would denote target frames, i.e., key frame. Blank circles denote frames that should be input to obtain key frames, i.e., frames that should be represented in the scenario file. It follows from expression 3 that the frame parameters of the frame set up in the scenario file in order to display the key frame P'n at time n are given as follows.

$$P_n = 4P'_n - P_{n-2} - 2P_{n-1} \quad (4)$$

By repeating the above calculation at each time, the frame parameters corresponding to the key frames and defining the frames that allow for the correction at the time of display can be obtained. The method of correcting key frames at the time of creating a scenario file differs depending on the method of frame correction in the content running device. By solving the expression for frame parameters that should be input as unknowns, similar correction can be performed. Information related to the method of correcting frames by the content running device may be entered by the user when a scenario file is created. Alternatively, the information may be stored in the storage device 366. The method of correction may be switched according to, for example, the type of content running device.

Figure 15:
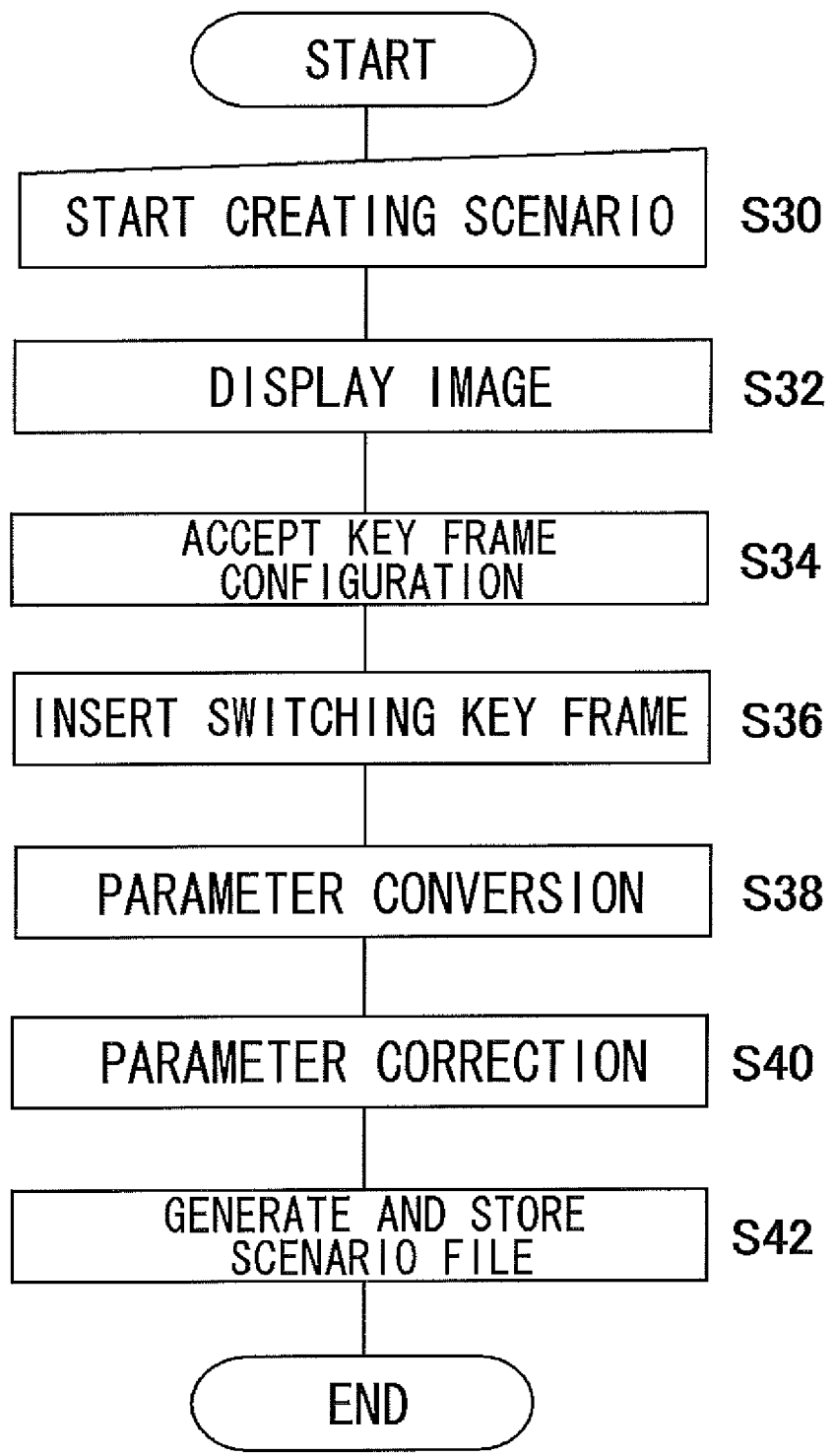
FIG. 15 is a flowchart showing the procedure whereby the content creation aiding device aids the creation of a scenario file.

A description will be given of the operation of the content creation aiding device having the configuration as described above. FIG. 15 is a flowchart showing the procedure whereby the content creation aiding device aids the creation of a scenario file. First, when the user enters a request for starting the creation of a scenario file along with the designation of image data that should be processed (S30), the displayed image processing unit 356 reads the designated image data from the storage device 366 and displays the image on the display device 368 (S32). The request acknowledging unit 354 acknowledges an input for setting up a key frame provided by the user viewing the display screen (S34). The key frame is set up on the image initially displayed regardless of the linked area.

When all key frames have been set up by the user, the key frame interpolation unit 358 derives frame parameters of a key frame that triggers image switching due to a link, and inserts the resultant key frame between the key frames set up by the user (S36). More specifically, the unit 358 reads the link configuration file 22 from the storage device 366 and identifies successive key frames accompanying the movement from outside a linked area into the linked area. The last frame occurring before the linked area is entered is added as a key frame. Of the frames interpolated between the last key frame occurring before the linked area and next key frame inside the linked area at predetermined time intervals, the first frame that enters the linked area is added as a key frame.

Subsequently, the coordinate conversion unit 360 converts parameters so that key frames following the additionally inserted key frame in frame parameters in the coordinate system of the link destination image (S38). Subsequently, the correction unit 362 corrects the key frame thus set up by performing calculation opposite to the calculation performed by the content running device to correct the frame (S40). The scenario output unit 364 creates a scenario file describing the corrected key frame, identification information of the image data, etc., and stores the file in the storage device 366 (S42). In this way, the content file comprising the image data 20, the link configuration file 22, and the scenario file 24 is created.

Figure 16:
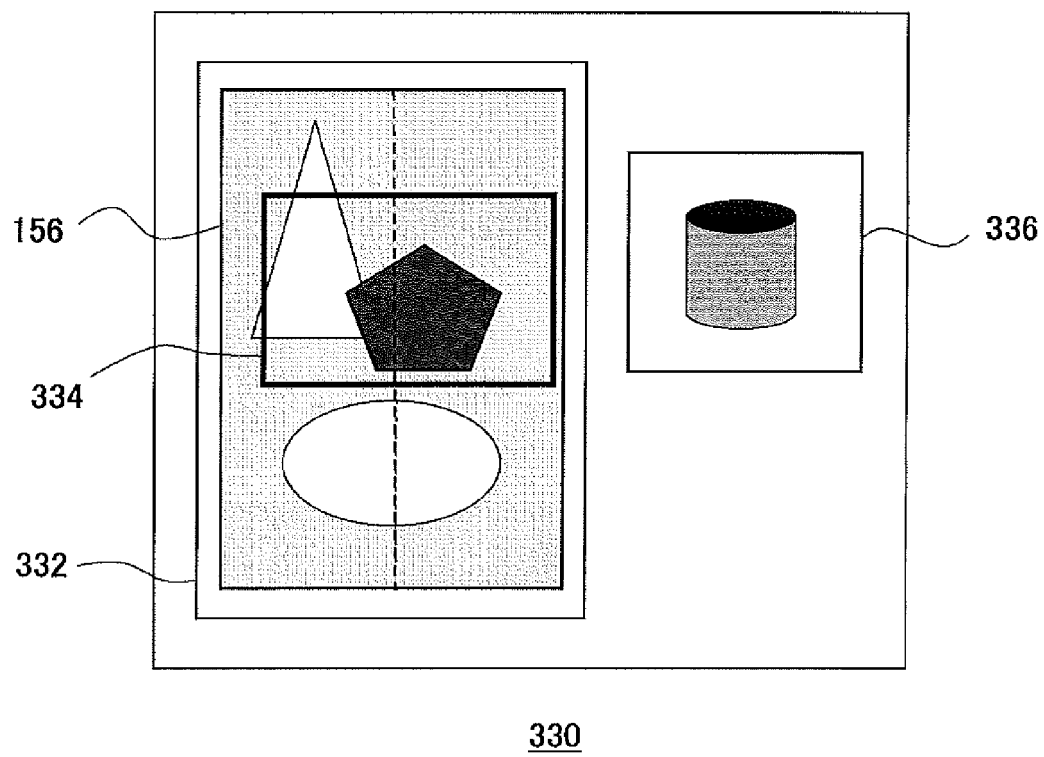
FIG. 16 shows an exemplary image displayed by a displayed image processing unit on a display device to assist the user to set up a key frame according to the embodiment.

FIG. 16 shows an exemplary image displayed by the displayed image processing unit 356 on the display device 368 to assist the user to set up a key frame. A key frame configuration acknowledging image 330 includes an image display area 332 for displaying the image 156 designated by the user as being displayed. In the image display area 332, a rectangle 334 indicating a frame is displayed on the image 156. The user changes the size and position of the rectangle. A key frame is set up when the rectangle assumes the shape that should be set up as a key frame and confirms the selection. By repeating the step as many times as the number of key frames, the frame parameters of the key frames are set up in the coordinate system of the image 156.

The key frame configuration acknowledging image 330 further includes a source image call area 336. The area 336 is provided when the content creation aiding device 350 is also used to create the link configuration file 22. The user causes an additional image in which a link should be established to be displayed in the source image call area 336. Linked areas can be set up in the respective images by using the request acknowledging unit 354 to select an area in the image that should be a linked area (e.g., by encircling the area), and by moving the area to a desired area on the image 156.

The embodiment as described above facilitates the creation of contents in which the display area in the image being displayed is moved and, when a specified area is displayed, the display is switched to another image to which a link is set up. More specifically, a key frame can be set up in the original image regardless of the area in which the link is set up. The parameters of the key frame occurring after image switching due to the link are converted into those in the coordinate system unique to the post-switching image. This facilitates the setting of continuous movement of the display area even if each image is allowed to have a coordinate system unique to its own so that the images can be independently displayed and processed. In this way, individual images can be displayed efficiently in the respective coordinate systems even if the image in which a link is set up has a hierarchical structure or is a moving image.

By allowing the movement of the display area before and after switching to be set on the same image, the movement of the display area having continuous appearance regardless of the switching (e.g., straight movement of the display area) can be easily set. By inserting, between user configured key frames, a key frame located on the motion vector between the user configured key frames and triggering image switching, the boundary where coordinate conversion occurs can be clearly defined. Further, the user is relieved of the load of adjusting key frames so that the motion vector remains unchanged upon image switching. By subjecting key frames to correction opposite to frame correction performed by the content running device, a scenario file can be created that properly displays key frames initially configured by the user.

Described above is an explanation based on an exemplary embodiment. The embodiment is intended to be illustrative only and it will be obvious to those skilled in the art that various modifications to constituting elements and processes could be developed and that such modifications are also within the scope of the present invention.

For example, the embodiment assumes that a scenario file is created on the content creation aiding device based on user configured key frames and in consideration of links and frame correction. Alternatively, user configured key frames may be stored as the scenario file so that the key frames are corrected in consideration of links and frame correction as the content running device runs the content. In this case, the key frame interpolation unit 358, the coordinate conversion unit 360, and the correction unit 362 in the content creation aiding device 350 of FIG. 12 should be provided in the content running device, and the procedure is as described in the embodiment.

What is claimed is:

1. A content creation aiding device for aiding the creation of content in which a display area taken from a plurality of images that are subject to display is moved according to a scenario file, which includes a list of respective frame parameters for a plurality of key frames that are to be displayed at specific points in time to show the movement of the display area, and where the frame parameters of each of the key frames include at least one of: x-direction offset, y-direction offset, magnification, and rotation, the device comprising:

a storage device configured to store a link configuration file and data for the plurality of images subject to display, the link configuration file being provided to: (i) define a switch from a first of the images being displayed to a second of the images to be displayed when movement of the display area reaches a specified linked area within the first image, and (ii) associate the specified linked area within the first image with a specified linked area of the second image, such that after the switch, the display area is moved starting at the specified linked area of the of the second image;

a request acknowledging unit configured to receive frame parameters of a plurality of user specified key frames serving as a starting point for determining the plurality of key frames of the scenario file;

a key frame interpolation unit configured to insert a plurality of continuous key frames between the user-specified key frames to define the movement of the display area to the linked area of the first image, and to additionally insert a boundary key frame between the continuous key frames that represents a boundary for switching between the first and second images; and a scenario file output unit configured to create the scenario file that describes the frame parameters corresponding to the user specified key frames, the inserted continuous key frames, and the boundary key frame, and to output the created file.

2. The content creation aiding device according to claim 1, wherein the key frame interpolation unit inserts the boundary key frame having a size and position that interpolate a change in the size and position of the continuous key frames as identified.

3. The content creation aiding device according to claim 1, wherein the second image is a higher-resolution version of the linked area in the first image, and the request acknowledging unit allows the user to configure a user specified key frame in the second image, on the first image.

4. The content creation aiding device according to claim 1, further comprising:

a coordinate conversion unit configured to convert frame parameters of continuous key frames following the boundary key frame inserted by the key frame interpolation unit, into frame parameters in a coordinate system unique to the second image, wherein the scenario file output unit describes the frame parameters resulting from the conversion by the coordinate conversion unit in the scenario file as being the parameters for the second image.

5. The content creation aiding device according to claim 1, further comprising a correction unit configured to acquire a calculation method for correction performed in the content running device, whereby input frame parameter values is corrected into frame parameters of an actually displayed frame, and to apply a calculation opposite to the acquired calculation to the key frame so that the key frame is displayed as a result of the correction performed in the content running device.

6. The content creation aiding device according to claim 1, wherein at least one of:

of images that should be displayed, the post-switching image is a higher-resolution version of the linked area in the pre-switching image, and the request acknowledging unit allows the user to configure a key frame in the post-switching image, on a screen where a partial area in the pre-switching image is displayed in a semi-transparent fashion so as to surround the post-switching image; and at least a part of the pre-switching image is displayed in a semi-transparent fashion, and the post-switching image occurring after the display is switched to the linked area is displayed.

7. The content creation aiding device according to claim 5, wherein the correction unit refers to the calculation methods for correction of frame parameters which is prestored in association with types of content running device, and selectively uses opposite calculation methods depending on a type of content running device.

8. A content creation aiding method for aiding the creation of content in which a display area taken from a plurality of images that are subject to display is moved according to a scenario file, which includes a list of respective frame parameters for a plurality of key frames that are to be displayed at specific points in time to show the movement of the display area, and where the frame parameters of each of the key frames include at least one of: x-direction offset, y-direction offset, magnification, and rotation, the method comprising:

reading from a storage device a link configuration file and data for the plurality of images subject to display, the link configuration file being provided to: (i) define a switch from a first of the images being displayed to a second of the images to be displayed when movement of the display area reaches a specified linked area within the first image, and (ii) associate the specified linked area within the first image with a specified linked area of the second image, such that after the switch, the display area is moved starting at the specified linked area of the of the second image;

receiving frame parameters of a plurality of user specified key frames serving as a starting point for determining the plurality of key frames of the scenario file;

inserting a plurality of continuous key frames between the user-specified key frames to define the movement of the display area to the linked area of the first image, and to additionally inserting a boundary key frame between the continuous key frames that represents a boundary for switching between the first and second images; and creating a scenario file that describes the frame parameters corresponding to the user specified key frames, the inserted continuous key frames, and the boundary key frame, and storing created file in the storage device.

9. A scenario file creation method for creating a scenario file for content in which a display area taken from a plurality of images that are subject to display is moved, the scenario file includes a list of respective frame parameters for a plurality of key frames that are to be displayed at specific points in time to show the movement of the display area, and where the frame parameters of each of the key frames include at least one of: x-direction offset, y-direction offset, magnification, and rotation, the method comprising:

reading from a storage device a link configuration file and data for the plurality of images subject to display, in which a link area is set up, the link configuration file being provided to: (i) define a switch from a first of the images being displayed to a second of the images to be displayed when movement of the display area reaches a specified linked area within the first image, and (ii) associate the specified linked area within the first image with a specified linked area of the second image, such that after the switch, the display area is moved starting at the specified linked area of the of the second image;

acquiring frame parameters of a plurality of user specified key frames configured for the first image and a display order thereof, the user specified key frames serving as a starting point for determining the plurality of key frames of the scenario file;

inserting a plurality of continuous key frames between the user-specified key frames to define the movement of the display area to the linked area of the first image, and to additionally inserting a boundary key frame between the continuous key frames that represents a boundary for switching between the first and second images;

converting the frame parameters of any of the key frames inside the linked area into frame parameters referenced to the second image as specified in the link configuration file;

creating a scenario file that describes the frame parameters and a display order thereof for each of the plurality of images, the frame parameters being for the user specified key frames, the inserted continuous key frames, and the boundary key frame; and storing the created file in the storage device.

10. A computer program embedded in a non-transitory, computer readable medium and providing a function of aiding the creation of content in which a display area taken from a plurality of images that are subject to display is moved according to a scenario file, which includes a list of respective frame parameters for a plurality of key frames that are to be displayed at specific points in time to show the movement of the display area, and where the frame parameters of each of the key frames include at least one of: x-direction offset, y-direction offset, magnification, and rotation, the program comprising:

a module configured to read from a storage device a link configuration file and data for the plurality of images subject to display, the link configuration file being provided to: (i) define a switch from a first of the images being displayed to a second of the images to be displayed when movement of the display area reaches a specified linked area within the first image, and (ii) associate the specified linked area within the first image with a specified linked area of the second image, such that after the switch, the display area is moved starting at the specified linked area of the of the second image;

a module configured to receive frame parameters of a plurality of user specified key frames serving as a starting point for determining the plurality of key frames of the scenario file;

a module configured to insert a plurality of continuous key frames between the user-specified key frames to define the movement of the display area to the linked area of the first image, and to additionally insert a boundary key frame between the continuous key frames that represents a boundary for switching between the first and second images; and a module configured to create the scenario file that describes the frame parameters corresponding to the user specified key frames, the inserted continuous key frames, and the boundary key frame, and to store the created file in the storage device.

11. A non-transitory, computer readable recording medium encoded with a computer program providing a function of aiding the creation of content in which a display area taken from a plurality of images that are subject to display is moved according to a scenario file, which includes a list of respective frame parameters for a plurality of key frames that are to be displayed at specific points in time to show the movement of the display area, and where the frame parameters of each of the key frames include at least one of: x-direction offset, y-direction offset, magnification, and rotation, the program comprising:

a module configured to read from a storage device a link configuration file and data for the plurality of images subject to display, the link configuration file being provided to: (i) define a switch from a first of the images being displayed to a second of the images to be displayed when movement of the display area reaches a specified linked area within the first image, and (ii) associate the specified linked area within the first image with a specified linked area of the second image, such that after the switch, the display area is moved starting at the specified linked area of the of the second image;

a module configured to receive frame parameters of a plurality of user specified key frames serving as a starting point for determining the plurality of key frames of the scenario file;

a module configured to insert a plurality of continuous key frames between the user-specified key frames to define the movement of the display area to the linked area of the first image, and to additionally insert a boundary key frame between the continuous key frames that represents a boundary for switching between the first and second images; and a module configured to create the scenario file that describes the frame parameters corresponding to the user specified key frames, the inserted continuous key frames, and the boundary key frame, and to store the created file in the storage device.

* * * * *